United States Patent [19]

Campbell

[11] 4,303,222
[45] Dec. 1, 1981

[54] PINCH VALVE

[75] Inventor: James A. Campbell, Monroeville, Pa.

[73] Assignee: Red Valve Company, Inc., Carnegie, Pa.

[21] Appl. No.: 118,921

[22] Filed: Feb. 6, 1980

[51] Int. Cl.³ .............................................. F16K 7/06
[52] U.S. Cl. ....................................... 251/7; 251/252
[58] Field of Search ................................ 251/7, 8, 252

[56] References Cited

U.S. PATENT DOCUMENTS

| 1,337,247 | 4/1920 | Maier | 251/8 |
| 2,167,952 | 8/1939 | Jordan | 251/7 |
| 2,660,395 | 11/1953 | Mair et al. | 251/7 |
| 3,165,293 | 1/1965 | McClure | 251/252 |

FOREIGN PATENT DOCUMENTS

| 1038850 | 9/1958 | Fed. Rep. of Germany. | |
| 2748143 | 5/1979 | Fed. Rep. of Germany | 251/7 |
| 535034 | 10/1955 | Italy. | |
| 639646 | 7/1950 | United Kingdom. | |

Primary Examiner—H. Jay Spiegel
Attorney, Agent, or Firm—Kirschstein, Kirschstein, Ottinger & Cobrin

[57] ABSTRACT

A pinch valve for throttling or terminating the flow of a fluid through a pipe or the like. The valve features two cam bodies within an extension of the valve body. An inner cam body is cammed into non-rotational translational movement in a direction towards and away from the flexible and resilient sleeve of the pinch valve by the cam surface of an outer cam body of circular cross-section which is at least partially rotatable by displacement of a turn handle. The handle may be partially turned about the axis of the outer cam body, to partially constrict or throttle fluid flow, or further turned to completely pinch the sleeve shut and totally terminate fluid flow.

6 Claims, 5 Drawing Figures

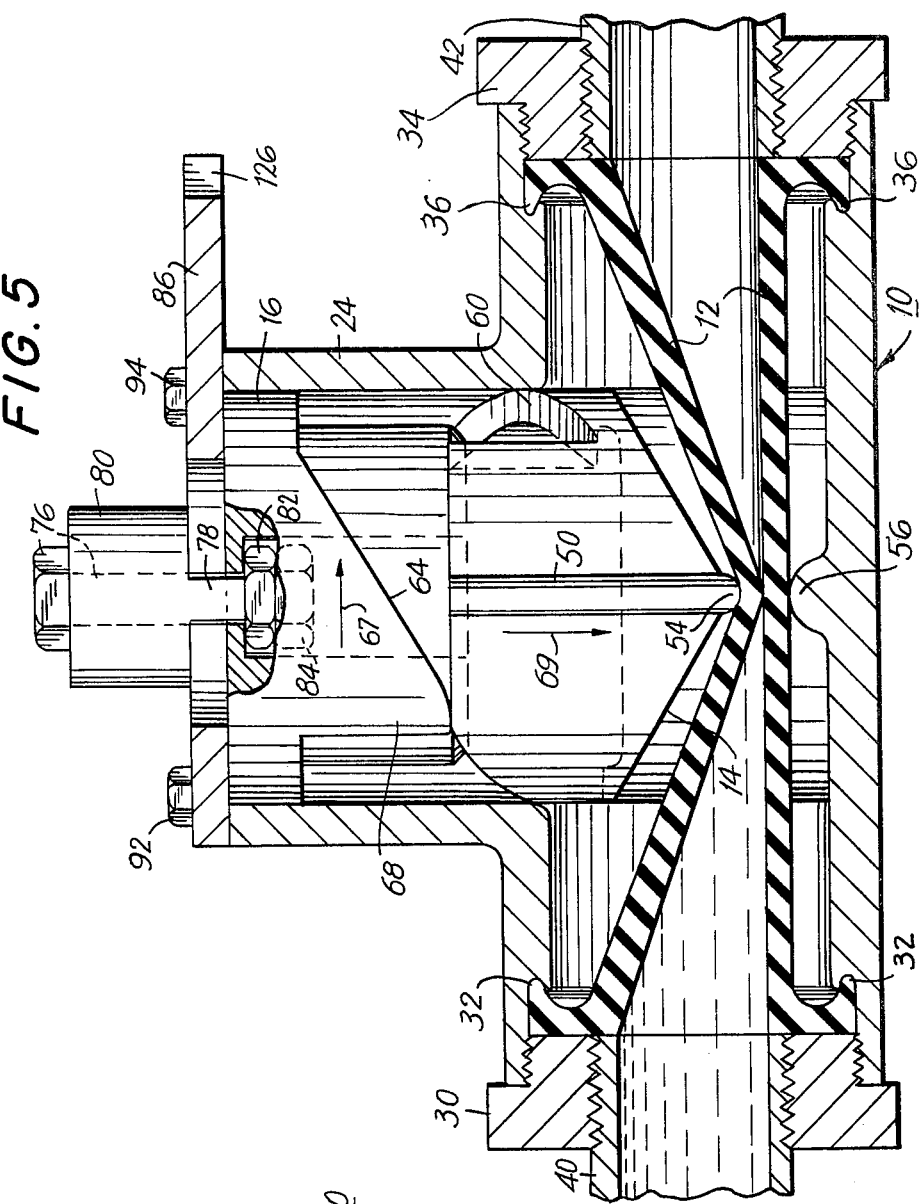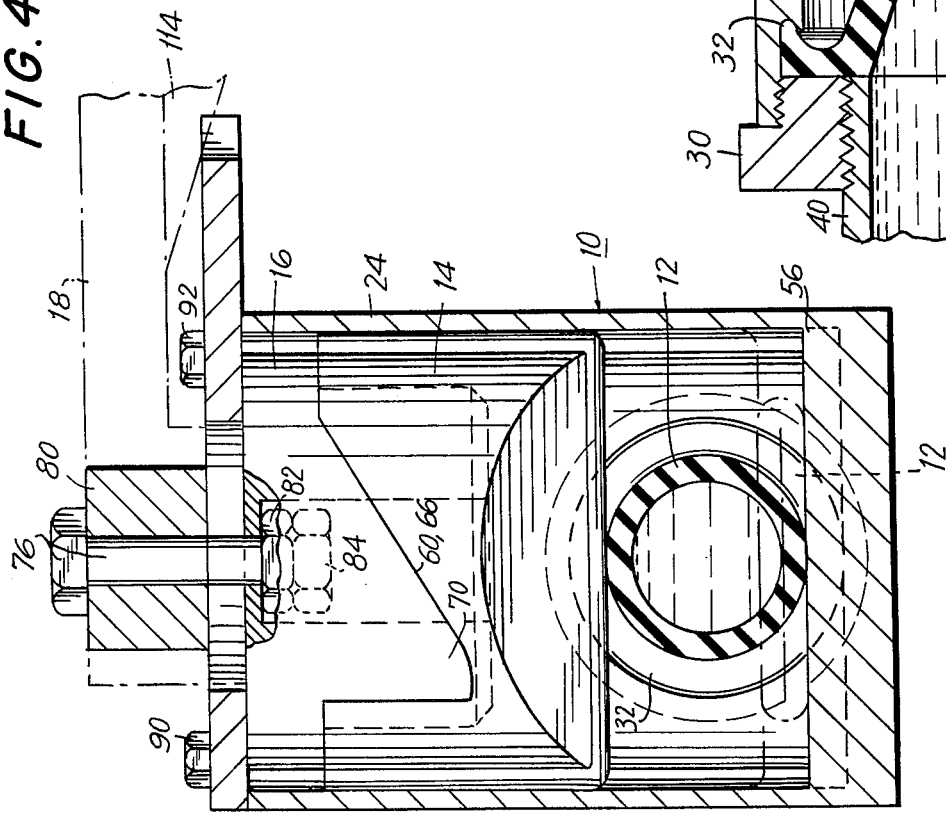

PINCH VALVE

BACKGROUND OF THE INVENTION

1. Field of the Invention

A pinch valve for modulating, throttling and curtailing or terminating the flow of a fluid.

2. Description of the Prior Art

Pinch valves basically consist of a flexible resilient cylindrical elastomeric sleeve of the like which is interposed in a continuous conduit, duct, pipe or tube, together with means to constrict the sleeve so as to curtail, terminate or control the flow of fluid through the conduit or the like. In most instances, the sleeve is concentrically oriented within an outer rigid valve housing, and means are provided to impress a fluid under pressure between the sleeve and the housing so that the sleeve is squeezed inwards and deformed or collapsed to provide a smaller fluid flow passage. In other instances, mechanical means are provided to pinch the sleeve to accomplish the same result. One problem encountered with pinch valves of the prior art is a tendency of the joints between the sleeve and/or the valve housing, and the continuous lengths of conduit or the like, to ultimately leak due to distortion of the sleeve and repeated flexing of the same.

Normally, a pinch valve sleeve is made from pure gum rubber, neoprene, BUNA, butyl, hypalon, urethane, viton, EPT (nordel), silicone and food grade rubber. Typically, any suitable flexible and resilient (and usually corrosion-resistant) material of construction may be employed for the sleeve. However, a synthetic rubber such as hypalon, BUNA, neoprene, a deformable plastic, or natural rubber are preferred. The flexible and resilient sleeve will in general be resiliently deformable and will be composed of any suitable material such as those mentioned supra. In this regard, it will be understood by those skilled in the art that any rubbery or rubber-like elastic material may be employed to fabricate the sleeve. Thus, hypalon is defined as a rubber material obtained by the chlorination and sulfonation of polyethylene. BUNA is defined as a rubber substitute prepared by the polymerization or copolymerization of butadiene. Neoprene is defined as polychloroprene made by the polymerization of chloroprene, i.e. neoprene is a generic name for synthetic rubber made by polymerization of 2-chloro-1,3-butadiene (prepared by the action of hydrogen chloride on monovinylacetylene).

Pinch valve constructions, as generally described herein, have been used in a wide variety of situations. More specifically, pinch valve constructions as described herein have been used in controlling the flow of, by way of example, solids in suspension (either in slurry or air-conveyed form), especially abrasive materials such as metallic ores, asbestos, fibers, sand, coal, sugar, wood chips or pulps, paper stock, plastic pellets, raw sewage, talc, cement, fly ash, and various chemicals and foodstuffs.

Among the prior art relating to pinch valve constructions may be mentioned U.S. Pat. Nos. 4,172,580; 4,125,125; 3,838,704; 3,483,892; 3,445,085; 3,441,245; 3,396,448; 3,371,677; 3,272,470 and 3,159,373; German Pat. No. 1,038,850; British Pat. No. 639,646 and Italian Pat. No. 535,034.

SUMMARY OF THE INVENTION

Purposes of the Invention

It is an object of the present invention to provide an improved pinch valve construction.

Another object is to provide a pinch valve which is rugged and reliable in operation and is of low cost.

A further object is to provide a pinch valve which is readily and simply fabricated and assembled in mass production facilities using unskilled labor.

An additional object is to provide a pinch valve which has good performance characteristics.

Still another object is to provide a pinch valve which is simpler than, but works as well as, prior art designs of greater complexity.

Still a further object is to provide a pinch valve which is competitive in performance and cost to known pinch valves now on the market.

Still an additional object is to provide an improved pinch valve construction for modulating, throttling, controlling, curtailing or completely terminating the flow of a fluid through a continuous tube, pipe, duct, conduit or the like.

These and other objects and advantages of the present invention will become evident from the description which follows.

Brief Description of the Invention

The pinch valve of the present invention includes a hollow valve body having an inlet opening for fluid ingress and an outlet opening for fluid egress. A flexible resilient sleeve extends between the openings in the valve body, so that a fluid stream flowing though the pinch valve flows successively through the inlet opening, the sleeve, and the outlet opening. The valve body has an extension generally perpendicular to the sleeve. The extension of the valve body has a chamber in communication with the sleeve. An inner cam body is provided within the chamber, the inner cam body having an inner end adjacent the sleeve. The inner cam body is located with the sleeve on its inner end, and has a cam surface on its outer end. The inner cam body is of non-circular cross-section, and the portion of the chamber at which the inner cam body is located has a complementary cross-section to guide the inner cam body for non-rotational translational movement of the inner cam body in a direction towards and away from the sleeve. An outer cylindrical cam body is provided within the chamber and is juxtaposed coaxially with the inner cam body. The outer cam body is a circular cross-section, and the portion of the chamber at which the outer cam body is located is also circular, to guide the outer cam body for rotary movement. The outer cam body has an inner cam surface which is in contact with the cam surface on the outer end of the inner cam body, such that rotation of the outer cam body cams the inner cam body inwards and against the sleeve, so that the inner end of the inner cam body pinches the sleeve. Finally, means such as a turn handle affixed to the outer cam body is provided to rotate the outer cam body.

It will be appreciated by those skilled in the art that opening of the valve, either partial or total, may easily be accomplished by reverse rotation of the outer cam body so that more of the cam surfaces engage each other and the inwards restraint against the inner cam body is lessened. This will automatically partially or fully open the valve since less pinching of the sleeve will allow the flexible and resilient sleeve to expand towards a more open and cylindrical shape since the fluid pressure inside the sleeve tends to distend it.

Generally, the sleeve and the openings in the valve body are cylindrical and coaxial. An integral ridge extension may be provided on the inside of the valve body and between the valve body per se and the sleeve, the ridge extension cooperating with the inner end of the inner cam body to pinch the sleeve.

The extension of the valve body will typically have at least one groove on the inner surface of the chamber, and the inner cam body will then have at least one rib on its lateral surface, with the rib extending in the groove. The rib and the groove constitute one suitable means for guiding the inner cam body for non-rotational translational movement of the inner cam body in a direction towards and away from the sleeve. Typically in this case, the chamber has a longitudinal axis, and the rib and the groove are rectilinear and parallel to the longitudinal axis of the chamber. Preferably in this case, and in a preferred embodiment of the invention as will appear infra, the lateral surface of the inner cam body has two opposed rectilinear ribs on opposite sides of the inner cam body, and the inner surface of the chamber has two opposed rectilinear grooves, each of the ribs and grooves being parallel to the axis of the chamber, with each of the ribs extending into one of the grooves.

The inner end of the inner cam body will usually be provided with a linear rib extension which extends transverse to the inner cam body. This linear rib extension serves to pinch the sleeve, when the outer cam body is rotated and cams the inner cam body towards the sleeve. Preferably, the linear rib extension is rectilinear and extends transverse to the longitudinal axis of the sleeve and has a rounded lower edge to preclude attrition or cutting of the sleeve as the inner cam body bears down on the sleeve in service. In a preferred configuration, the lateral surface of the inner cam body has at least two opposed rectilinear ribs on opposite sides of the inner cam body and the rectilinear rib extension extends between the inner ends of the ribs, so that a continuous protuberance extends about the sides and inner end of the inner cam body.

A preferred configuration of cam surfaces entails the provision of a cam surface on the outer end of the inner cam body which consists of two opposed cut-out portions of the inner cam body, each of these portions having a cam surface which cams the inner cam body in the same direction as the other portion. The outer cam body will then have an inner cam surface consisting of two oppposed extensions, each of the extensions mating with and being in contact with the cam surface of one of the cut-out portions of the inner cam body.

Typically, the inner cam body is coaxial with the circular portion of the chamber in the extension of the valve body. In a preferred embodiment, the means, such as a turn handle, to rotate the outer cam body, turns the outer cam body about 90 degrees from a completely open setting of the pinch valve, to a completely closed setting of the pinch valve.

The present improved pinch valve provides several salient advantages. The valve is relatively simple with fewer and less complex parts than prior art pinch valves; consequently the valve is readily and easily fabricated and assembled at low cost in mass production facilities using unskilled labor. The valve is rugged, serviceable and reliable in operation. The valve is easily assembled and disassembled in the field. The valve has good performance characteristics and works as well as prior art designs of greater complexity. The valve is highly competitive in performance and cost to known pinch valves now on the market. Thus one advantage is that an improved pinch valve construction has been provided for modulating, throttling, controlling, curtailing or completely terminating the flow of a fluid through a continuous tube, pipe, duct, conduit or the like.

The invention accordingly consists in the features of construction, combination of elements, and arrangement of parts which will be exemplified in the device and article of manufacture hereinafter described, and of which the scope of application will be indicated in the appended claims.

BRIEF DESCRIPTION OF THE DRAWINGS

In the accompanying drawings in which is shown one of the various possible embodiments of the invention:

FIG. 4 is a sectional elevation view taken substantially along the line 4—4 of FIG. 2; and FIG. 5 is an elevation view similar to FIG. 3, but showing the valve in fully closed disposition, with the sleeve pinched shut by the inner cam body.

DETAILED DESCRIPTION OF THE PREFERRED EMBODIMENTS

Figure 1:
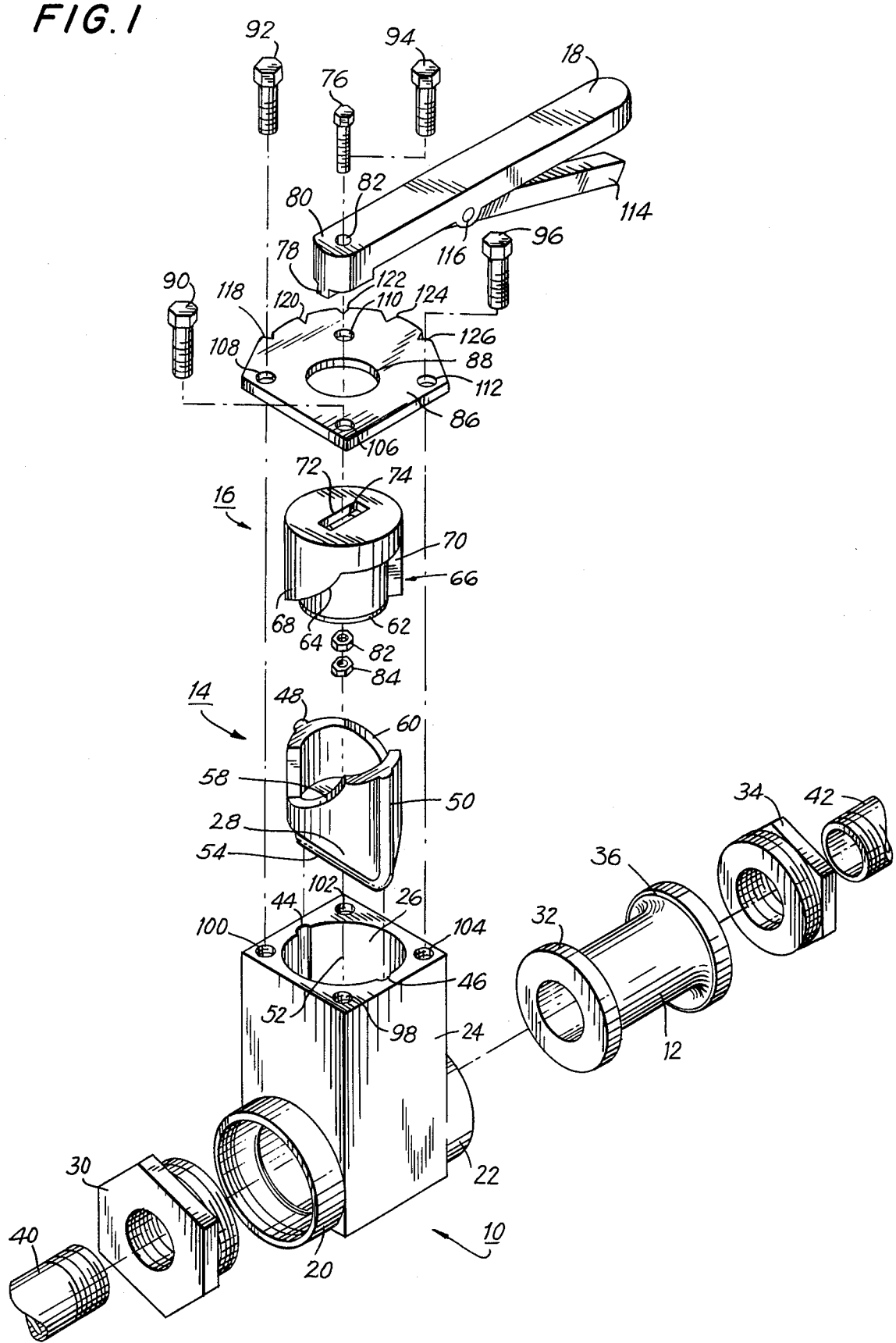
FIG. 1 is an exploded perspective view of the pinch valve.

Referring now to FIG. 1, the present pinch valve is characterized by the provision of a hollow valve body generally designated as 10, a flexible resilient cylindrical sleeve 12, an inner cam body 14, an outer cylindrical cam body 16, and a turn handle 18 which is grasped and manually turned to turn or partially rotate the outer cam body 16, as will appear infra.

The valve body 10 has an inlet opening at the threaded cylindrical extension 20, for fluid ingress, and an outlet opening at the threaded cylindrical extension 22, for fluid egress. In accordance with the present invention, the valve body 10 also has an extension 24 which is generally perpendicular to the sleeve 12 in the fully assembled pinch valve, in which assembly the sleeve 12 will extend within the valve body 10 between the extensions 20 and 22. The sleeve 12 thus extends between the openings in extensions 20 and 22, so that a fluid stream flowing through the pinch valve flows successively through the inlet opening at 20, the sleeve 12 and the outlet opening at 22.

The extension 24 of the valve body 10 has a chamber 26 in communication with the sleeve 12 (in the fully assembled pinch valve). The inner cam body 14 is disposed within the chamber 26, with the inner end 28 of the inner cam body 14 being adjacent the sleeve 12 in service.

Figure 3:
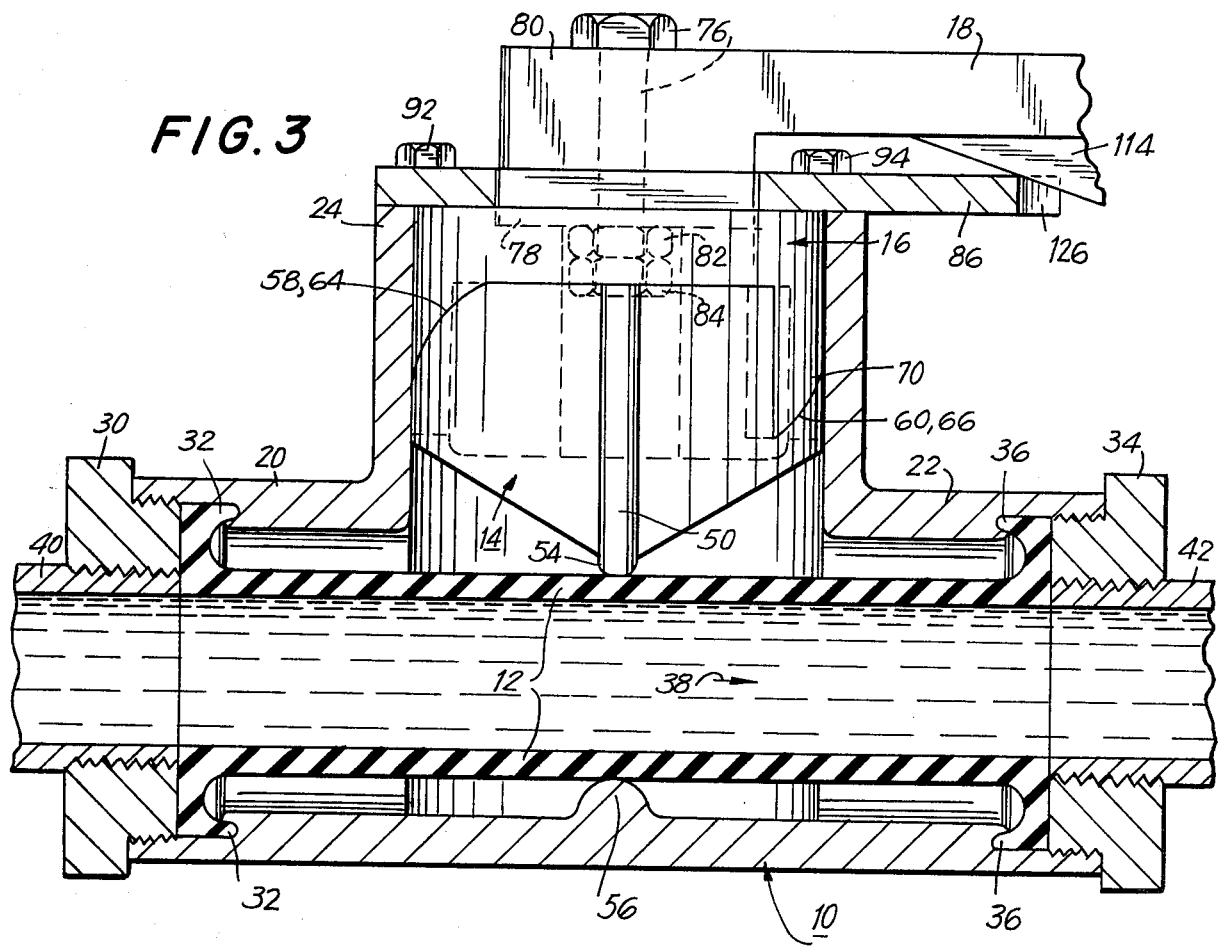
FIG. 3 is a sectional elevation view taken substantially along the line 3—3 of FIG. 2.

In practice, and as best seen in FIGS. 3 and 5, an externally and internally threaded adapter-coupling 30 is screwed into the extension 20 so as to press a lip 32 at the end of the sleeve 12 into a recess in the extension 20, to thereby provide sealing of the sleeve 12 within the valve body 10 against fluid leakage at the interface between the inlet end of the sleeve 12 and the extension 20. Similarly, an adapter-coupling 34 comparable in configuration and function to the coupling 30 is provided to compress lip 36 at the outlet end of the sleeve 12 into a recess in the extension 22. Fluid flow is in the direction indicated by arrow 38 (FIG. 3). One threaded end of inlet pipe length 40 is screwed into the adapter-coupling 30, while one threaded end of outlet pipe length 42 is screwed into the adapter-coupling 34, see FIGS. 3 and 5.

Referring now to the valve body extension 24, the portion of the chamber 26 at which the inner cam body 14 is located has a cross-section to guide the inner cam body 14 for nonrotational translational movement of the body 14 in a direction towards and away from the sleeve 12, namely two grooves 44 and 46 on the inner surface of the chamber 26. These grooves 44 and 46 cooperate with respective ribs 48 and 50 on the lateral surface of the inner cam body 14, i.e. each rib 48 or 50 extends into its respective groove 44 and 46 in the assembled pinch valve, so that the inner cam body 14 slides up and down in service, with each rib sliding in its respective groove. As shown, the chamber 26 is generally cylindrical and has a longitudinal axis 52 which in this case is vertical; the ribs 48 and 50 and the grooves 44 and 46 are rectilinear and vertical, and are parallel to the longitudinal axis 52 of the chamber 26.

The inner end 28 of the inner cam body 14 is preferably provided, as shown, with a linear rib extension 54 which extends transverse to the inner cam body 14. As will appear infra with reference to FIG. 5, the linear rib extension 54 serves to pinch the sleeve 12 when the outer cam body 16 is rotated and cams the inner cam body 14 towards the sleeve 12. This linear rib extension 54, as shown, is preferably rectilinear and has a rounded lower edge, and extension 54 extends between the inner ends of the ribs 48 and 50, so that a continuous protuberance extends about the sides and inner end 28 of the inner cam body 14.

As seen in FIGS. 3 and 5, an integral lower ridge extension 56 is preferably provided on the inside of the valve body 10. This extension 56 cooperates with the inner end 28 of the inner cam body 14, or more specifically extension 56 cooperates with the linear rib extension 54, to pinch the sleeve 12, as best seen in FIG. 5.

Referring now to the outer end of the inner cam body 14, this outer end of body 14 is provided with two opposed curved cam surfaces 58 and 60; these cam surfaces 58 and 60 consist of and are derived from two opposed cut-out portions of the inner cam body 14, each of the portions having a cam surface 58 or 60 which cams the inner cam body 14 in the same direction as the other portion.

The outer cylindrical cam body 16 is also disposed within the chamber 26 and juxtaposed coaxially with the inner cam body 14 in the assembled pinch valve. As shown, the outer cam body 16 is of circular cross-section, and the upper portion of the chamber 26 at which the outer cam body 16 is located is circular to guide the outer cam body 16 for rotary movement. The inner end 62 of the outer cam body 16 has inner cam surfaces 64 and 66 which are in contact with the respective cam surfaces 58 and 60 on the outer end of the inner cam body 14, such that rotation of the outer cam body 16, as indicated in FIG. 5 by arrow 67, cams the inner cam body 14 inwards and downwards and against the sleeve 12, as indicated in FIG. 5 by arrow 69, so that the inner end 28 of the inner cam body, and more specifically the linear rib extension 54, pinches the sleeve 12 and throttles, curtails or (in the case of FIG. 5) completely terminates fluid flow. This latter disposition of the elements is shown in FIG. 5, with the sleeve 12 completely collapsed and pinched shut between elements 54 and 56, so that fluid flow is completely terminated. In this configuration of the invention, the outer cam body 16 has an inner cam surface formed by and consisting of two opposed extensions 68 and 70, each of the extensions 68 and 70 mating with and being in contact with the respective cam surface 58 or 60 of one of the cut-out portions of the inner cam body 14.

As shown, the inner cam body 14 is preferably coaxial with the circular portion of the chamber 26 in the extension 24 of the valve body.

Figure 2:
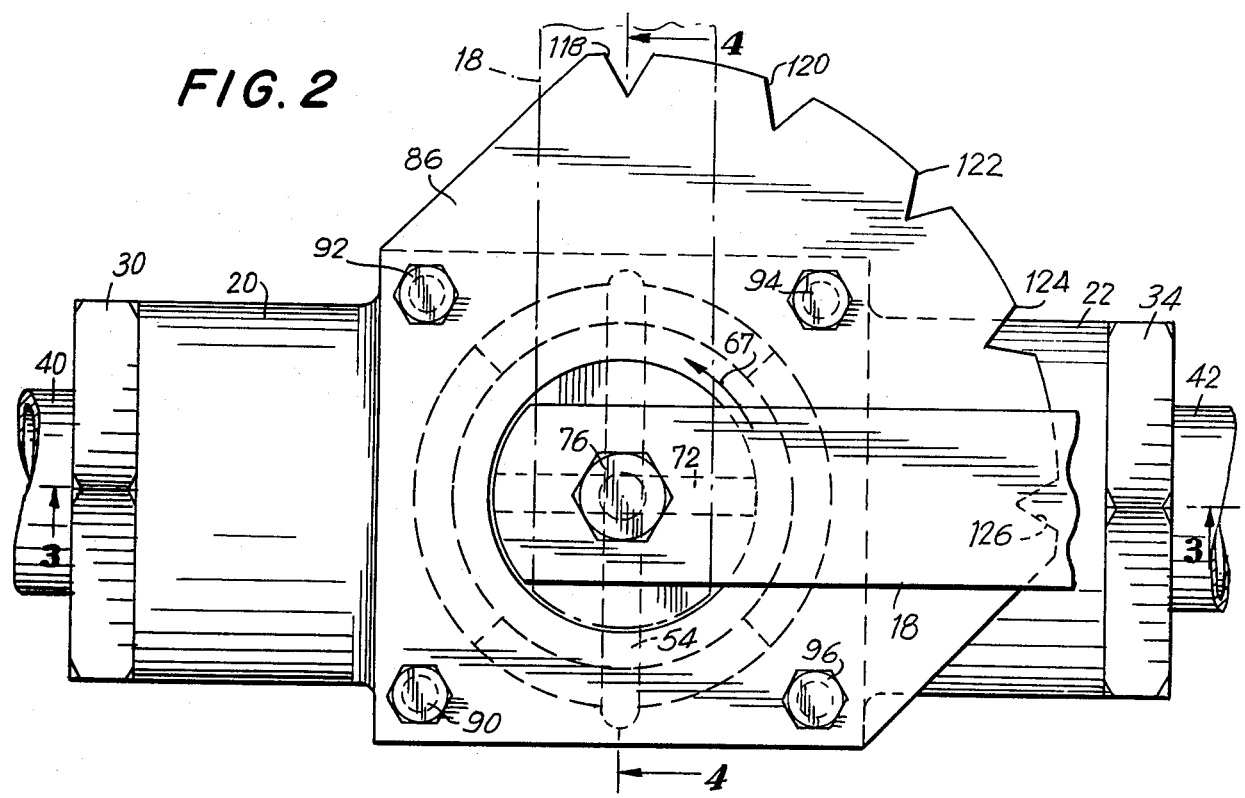
FIG. 2 is a plan view of the valve in fully open disposition.

The preferred means to rotate the outer cam body will now be described. The outer end of the outer cam body 16 is provided with a central rectangular slot 72, as best seen in FIG. 1. A central opening 74 extends downwards through the outer cam body 16 from the slot 72, to accommodate a central threaded bolt 76. In service, a guide tongue 78 on the inner end 80 of the turn handle 18 extends into the slot 72, and the bolt 76 extends through central hole 82 in end 80 of handle 18, through tongue 78, through opening 74 and through the outer cam body 16, and is secured by lower nut 82 and locknut 84. Thus, the handle 18 may be manually manipulated and pivoted horizontally about the vertical central axis 52 in the assembled pinch valve, so as to partially rotate the outer cam body 16 as indicated by arrow 67 (FIGS. 2 and 5) about the vertical axis 52.

In the configuration as shown, means is provided to set the turn handle 18 into five positions, ranging from a fully open valve position as shown in full outline of handle 18 to a fully closed valve position as shown in phantom outline of handle 18. Thus, a cover plate 86 having a central circular opening 88 is interposed between the turn handle 18 and the outer cam body 16. The cover plate 86 is secured to the top of the valve body extension 24 by the four threaded attachment bolts 90, 92, 94 and 96 which extend into respective threaded holes 98, 100, 102 and 104 in the top surface of extension 24 in the fully assembled pinch valve via respective holes 106, 108, 110 and 112 in the cover plate 86. The turn handle 18 is provided with a lower valve setting arm 114, the inner end of which is pivotally attached to the turn handle 18 at 116, so that as the turn handle 18 is manipulatively partially rotated about vertical axis 52 to change the valve opening setting, the arm 114 may be inserted into any one of the notches 118, 120, 122, 124 or 126 in the periphery of the cover plate 86, so as to secure the turn handle 18 against inadvertent displacement and thereby secure the outer and inner cam bodies 16 and 14 against movement. The notch 126 corresponds to a fully open disposition of the pinch valve as shown in full outline; the notch 118 corresponds to a fully closed disposition of the pinch valve as shown in phantom outline of turn handle 18 and appurtenances thereto and as shown in FIG. 5; and the notches 120, 122 and 124 correspond to successively more open partially open dispositions of the pinch valve via partial pinching of the sleeve 12, accomplished by only partial downwards displacement of the inner cam body against the sleeve 12 and in the direction shown by arrow 69 (FIG. 5). As discussed supra, FIG. 5 shows in full outline the disposition of the several elements when the pinch valve is fully closed by the pinching shut of the sleeve 12.

It thus will be seen that there is provided a pinch valve which achieves the various objects of the invention and which is well adapted to meet the conditions of practical use.

As various possible embodiments might be made of the above invention, and as various changes might be made in the embodiment above set forth, it is to be understood that all matter herein described or shown in the accompanying drawings is to be interpreted as illustrative and not in a limiting sense. Thus, it will be understood by those skilled in the art that although preferred and alternative embodiments have been shown and described in accordance with the Patent Statutes, the invention is not limited thereto or thereby.

Having thus described the invention, there is claimed as new and desired to be secured by Letters Patent:

1. A pinch valve comprising:
   (A) a hollow valve body having:
      (i) an inlet opening for fluid ingress; and
      (ii) an outlet opening for fluid egress;
   (B) a flexible resilient sleeve extending between the openings in the valve body, so that a fluid stream flowing through the pinch valve flows successively through the inlet opening, the sleeve and the outlet opening;
   (C) an extension of the valve body, said extension being substantially perpendicular to the sleeve and having a chamber in commmunication with the sleeve;
   (D) an inner cam body within the chamber, said inner cam body being located with the sleeve on its inner end and having:
      (i) a cam surface at its outer end consisting of two diametrically opposed cut-out portions of the inner cam body, each of said portions having identical cam surfaces; and
      (ii) two diametrically opposed rectilinear ribs on opposite sides of said inner cam body, each rib being perpendicular to the valve sleeve;
   (E) the inside surface of the chamber having two diametrically opposed rectilinear grooves, each of said grooves being perpendicular to the valve sleeve;
   (F) the ribs being slidable in the grooves to constitute means to guide the inner cam body for non-rotational translational movement in a direcction towards and away from the sleeve;
   (G) an outer cylindrical cam body within said chamber and juxtaposed coaxially in end to end relationship with said inner cam body:
      (i) said outer cam body being of circular cross-section;
      (ii) a portion of said chamber at which the outer cam body is located being circular to guide the outer cam body for rotary movement;
      (iii) the outer cam body having an inner cam surface consisting of two diametrically opposed identical camming ramps each mating with and being in contact with a different one of said cut-out portions of the inner cam body;
      (iv) such that rotation of said outer cam body in one certain direction cams said inner cam body inwards and against said sleeve whereby the inner end of said inner cam body pinches said sleeve and opposite rotation of said outer cam body permits the sleeve to expand;
   (H) means to rotate said outer cam body;
   (I) a transverse integral ridge at the bottom of the valve body; and
   (J) a linear rib at the bottom of the inner cam body and connecting the lower ends of the opposed rectilinear ribs, said linear rib being registered with the transverse integral ridge;
   (K) said ridge and rib cooperating between them to serve to pinch the sleeve when the outer cam body is rotated in said one certain direction to cam the inner cam body inwards towards the sleeve.

2. The pinch valve of claim 1 in which the openings in the valve body, and the sleeve, are cylindrical and coaxial.

3. The pinch valve of claim 1 in which the chamber has a longitudinal axis, and in which the rib and the groove are rectilinear and parallel to said longitudinal axis of the chamber.

4. The pinch valve of claim 1 in which the linear rib is rectilinear and has a rounded lower edge.

5. The pinch valve of claim 1 in which the inner cam body is coaxial with the circular portion of the chamber in the extension of the valve body.

6. The pinch valve of claim 1 in which the means to rotate the outer cam body turns the outer cam body about 90 degrees from a completely open setting of the pinch valve to a completely closed setting of the pinch valve.

* * * * *